United States Patent
Hibino et al.

(10) Patent No.: US 10,198,673 B2
(45) Date of Patent: Feb. 5, 2019

(54) CAMERA SYSTEM

(71) Applicant: DENSO CORPORATION, Kariya, Aichi-pref. (JP)

(72) Inventors: Katsuhiko Hibino, Kariya (JP); Tatsuhiko Futamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/634,169

(22) Filed: Jun. 27, 2017

(65) Prior Publication Data

US 2017/0372176 A1   Dec. 28, 2017

(30) Foreign Application Priority Data

Jun. 28, 2016   (JP) .................. 2016-127755

(51) Int. Cl.
| | |
|---|---|
| *G06K 9/78* | (2006.01) |
| *G06K 9/00* | (2006.01) |
| *H04B 7/24* | (2006.01) |
| *H04B 10/114* | (2013.01) |
| *H04N 5/225* | (2006.01) |
| *H04N 7/18* | (2006.01) |
| *B60R 1/04* | (2006.01) |
| *B60R 1/12* | (2006.01) |
| *B60R 11/04* | (2006.01) |
| *B60R 11/00* | (2006.01) |

(52) U.S. Cl.
CPC .............. *G06K 9/78* (2013.01); *B60R 1/04* (2013.01); *B60R 1/12* (2013.01); *B60R 11/04* (2013.01); *G06K 9/00798* (2013.01); *G06K 9/00805* (2013.01); *G06K 9/00818* (2013.01); *G06K 9/00825* (2013.01); *H04B 7/24* (2013.01); *H04B 10/114* (2013.01); *H04N 5/2252* (2013.01); *H04N 5/2257* (2013.01); *H04N 7/183* (2013.01); *B60R 2001/1253* (2013.01); *B60R 2011/0026* (2013.01); *B60R 2300/406* (2013.01); *B60R 2300/80* (2013.01)

(58) Field of Classification Search
CPC .. G06K 9/78; G06K 9/00798; G06K 9/00818; G06K 9/00825; G06K 9/00805; H04N 5/2252; H04N 5/2257; H04N 7/183; H04B 7/24; H04B 10/114; B60R 11/04; B60R 1/12; B60R 1/04; B60R 2300/80
See application file for complete search history.

(56) References Cited

U.S. PATENT DOCUMENTS

| | | |
|---|---|---|
| 2004/0230358 A1 | 11/2004 | Stam et al. |
| 2014/0160284 A1 | 6/2014 | Achenbach et al. |
| 2014/0226012 A1 | 8/2014 | Achenbach |
| 2015/0015713 A1 | 1/2015 | Wang et al. |

FOREIGN PATENT DOCUMENTS

WO   2013123161 A1   8/2013

*Primary Examiner* — Padma Haliyur
(74) *Attorney, Agent, or Firm* — Knobbe, Martens, Olson & Bear, LLP

(57) ABSTRACT

A camera system mounted on a vehicle includes a first substrate including an image sensor that generates image information by photoelectric conversion and a first communication unit, and a second substrate including a second communication unit for performing wireless communication with the first communication unit and a first information processing section at least capable of recognition processing for recognizing a situation outside the vehicle based on the image information acquired via the second communication unit.

12 Claims, 9 Drawing Sheets

CAMERA SYSTEM

CROSS-REFERENCE TO RELATED APPLICATION

This application is based on and claims the benefit of priority from earlier Japanese Patent Application No. 2016-127755 filed Jun. 28, 2016, the description of which is incorporated herein by reference.

TECHNICAL FIELD

The present disclosure relates to a camera mounted on and used in a vehicle.

BACKGROUND

In a vehicle-mounted camera including a camera module having a substrate on which an imager is disposed, and a main substrate for performing communication and other controls with an external device, although the substrate of the camera module is mounted at an angle relative to an objective imaging target, the main substrate is disposed in consideration of miniaturization of a casing and aesthetic appearance in the vehicle.

Therefore, the substrate of the camera module and the main substrate are formed as separate substrates.

Therefore, as disclosed in WO 2013/123161, for example, the main substrate and the substrate of the camera module are connected using a flexible cable to perform communication therebetween.

When the amount of communication between the main substrate and the substrate of the camera module increases, it becomes necessary to use a flat wire cable.

However, when a flat wire cable is used, the degree of freedom of layout may decrease.

SUMMARY

An embodiment provides a camera system that improves a degree of design freedom.

A camera system mounted on a vehicle according to a first aspect includes a first substrate including an image pickup element for generating image information by photoelectric conversion and a first communication unit, and a second substrate including a second communication unit for performing wireless communication with the first communication unit and a first information process section at least capable of performing a recognition process for recognizing a situation outside the vehicle based on the image information acquired via the second communication unit.

According to such a configuration, since the first substrate and the second substrate communicate with each other wirelessly, and therefore the cable does not have to be taken into consideration when designing, the degree of freedom in designing the camera system is improved compared with a configuration in which the first substrate and the second substrate communicate with each other using a cable. Further, it is possible to miniaturize the camera system.

DETAILED DESCRIPTION OF THE PREFERRED EMBODIMENTS

Hereinafter, embodiments of the present disclosure will be described with reference to the drawings.

[1. First Embodiment]
[1-1. Configuration]
(1) Position Where a Camera System is Attached.

Figure 1:
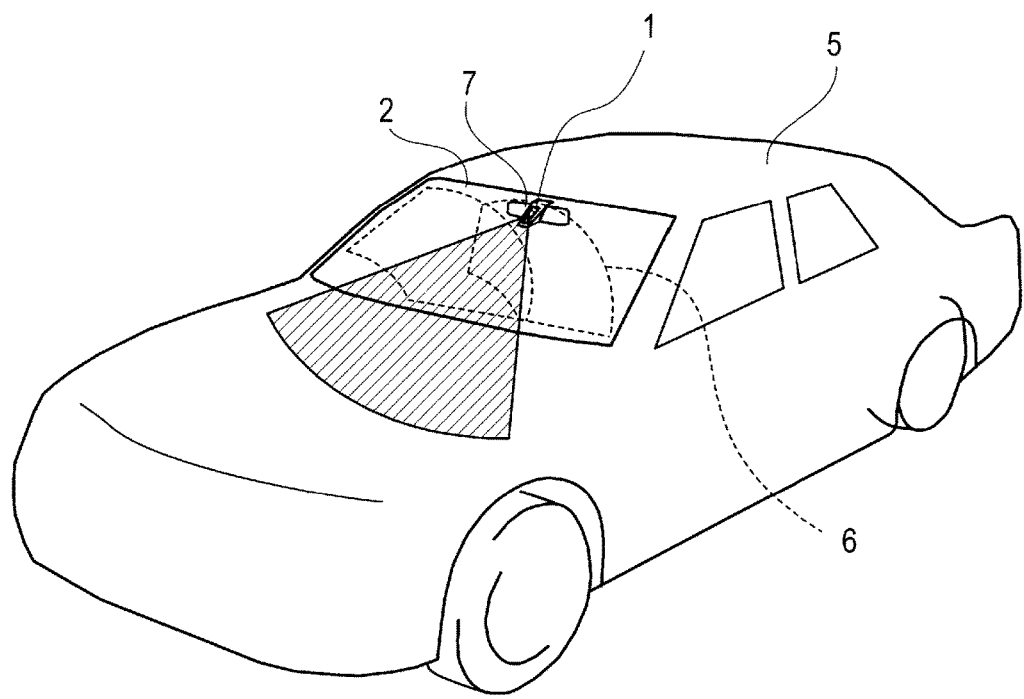
FIG. 1 shows a perspective view explaining an arrangement of a camera system.

As shown in FIG. 1, a camera system 1 is a device attached to and used in a vehicle 5.

A position where the camera system 1 is attached is an upper side and at a center in a left-and-right direction of a windshield 2 on an inner side (a cabin side) of the windshield 2, and the position at a back side of a wiper wiping range 6 where a wiper wipes an outer surface of the windshield 2.

The position of the camera system 1 is also in a vicinity of a rear-view mirror 7.

A field of view of the camera system 1, that is, an imaging range of the camera system 1 is in front of the vehicle 5.

The camera system 1 images the front of the vehicle 5 through the wiper wiping range 6.

In the following description, the vehicle 5 will also be simply described as an own vehicle.

(2) Configuration of the Camera System.

Figure 2:
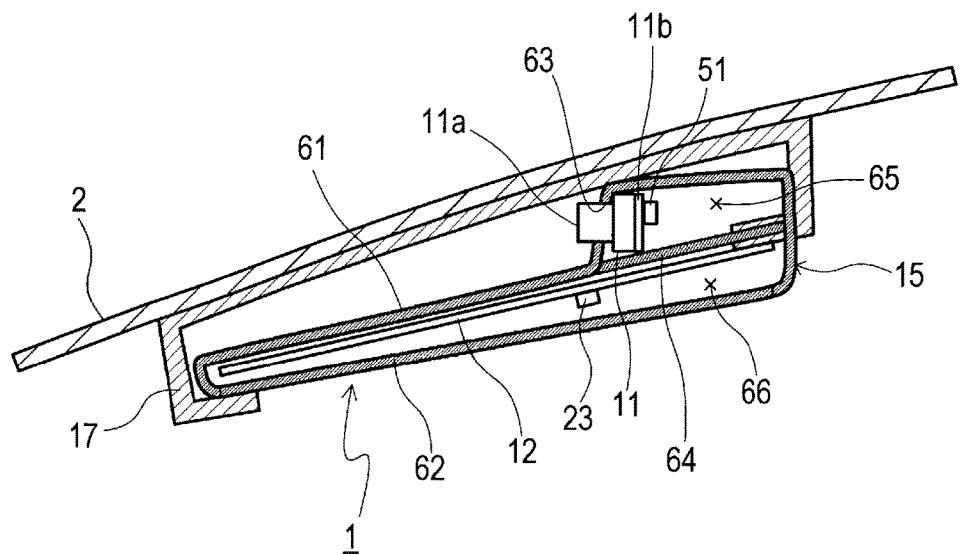
FIG. 2 shows a sectional view of the camera system of a first embodiment with a plane extending front to rear and top to bottom of the vehicle.
Figure 3:
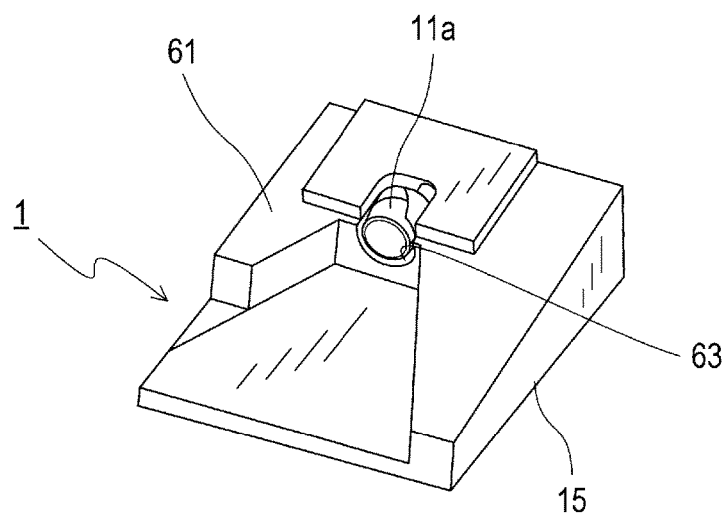
FIG. 3 shows a perspective view of the camera system of the first embodiment.
Figure 4:
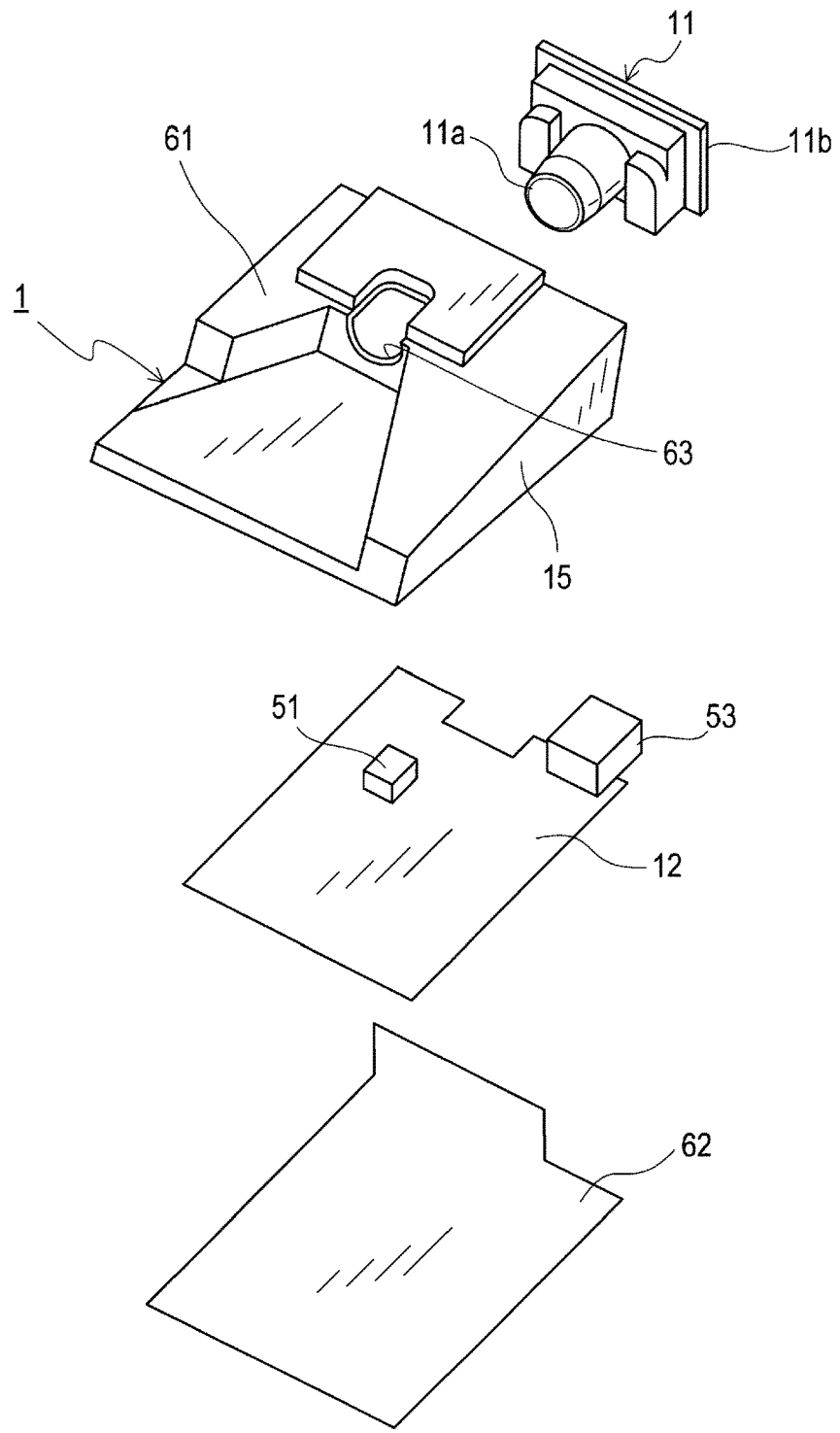
FIG. 4 shows an exploded perspective view of the camera system of the first embodiment.

As shown in FIGS. 2 to 4, the camera system 1 includes a camera module 11 having a first substrate 11b, a second substrate 12, a casing 15, and a fixture 17 for fixing the casing 15 to the windshield 2.

The camera module 11 includes a lens unit 11a and the first substrate 11b.

The lens unit 11a has a plurality of lenses and a cylindrical lens barrel for holding the plurality of lenses.

Figure 5:
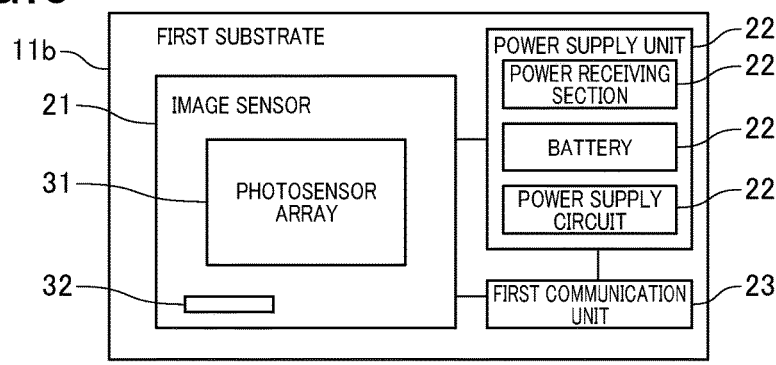
FIG. 5 shows a block diagram of an electrical configuration of a first substrate.

As shown in FIG. 5, the first substrate 11b includes an image sensor 21, a power supply unit 22, a first communication unit 23, and the like.

The image sensor 21 includes a photosensor array 31 and an exposure control circuit 32 for controlling exposure.

Incident light entered into the lens unit 11a passes through each lens and forms an image on the photosensor array 31 disposed on a light receiving surface of the image sensor 21.

The image sensor 21 converts a subject image formed by the incident light into an electric signal (photoelectric conversion) and outputs it.

Information indicated in this output signal is hereinafter referred to as image information.

The image sensor 21 corresponds to an image pickup element.

The exposure control circuit 32 detects the brightness of a captured image inputted based on the signal outputted from the image sensor 21, and controls the exposure timing and the like based on the detected brightness.

The power supply unit 22 includes a power receiving section 41, a battery 42, a power supply circuit 43, and the like.

The power receiving section 41 is a device that receives power supplied from a power transmission unit 55 of the second substrate 12 (to be described later) in a contactless manner, and includes a power receiving coil, an AC/DC conversion circuit, and a CPU (all not shown) that controls a charging to the battery 42.

The AC/DC conversion circuit rectifies AC power received from a power transmission coil (to be described later) of a power supplying device via the power receiving coil to convert the AC power to DC power, and converts the DC power into DC power of a predetermined voltage and supplies it to the battery 42 which is a secondary battery.

The power supply circuit 43 supplies the electric power stored in the battery 42 to each part of the first substrate 11b.

That is, the camera module 11 is driven by the electric power received by the power receiving section 41.

The first communication unit 23 executes wireless communication with a second communication unit 51 (to be described later).

At least the first communication unit 23 outputs the image information acquired by the image sensor 21 to the second substrate 12, and inputs a control signal for controlling operation of the image sensor 21 from the second substrate 12.

Figure 6:
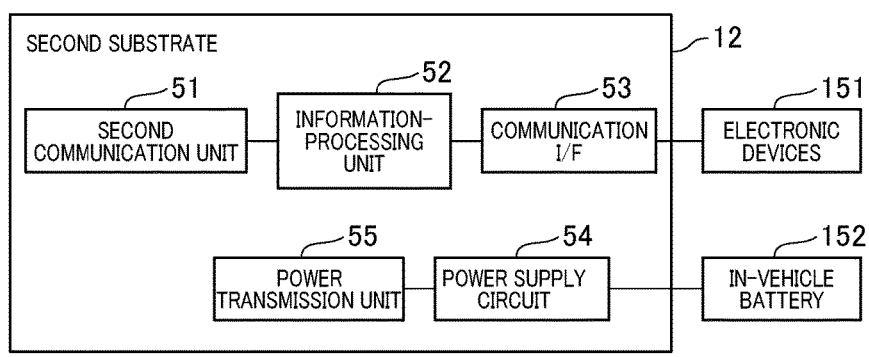
FIG. 6 shows a block diagram of an electrical configuration of a second substrate.

As shown in FIG. 6, the second substrate 12 has a second communication unit 51, an information-process unit 52, the communication interface 53 (hereinafter referred to as a communication I/F 53), a power supply circuit 54, a power transmission unit 55, and the like.

The second communication unit 51 executes wireless communication with the first communication unit 23.

In the present embodiment, the first communication unit and the second communication unit 51 perform radio communication.

It should be noted that optical wireless communication using light may be used, or communication using sound waves may also be used instead of wireless communication by radio waves.

The information-process unit 52 is composed mainly of a CPU, a ROM, a RAM and the like, and executes recognition process and vehicle control process.

Note that recognition targets recognized by the recognition process and process contents of the vehicle control process will be described later.

The communication I/F 53 is an interface for communicating with electronic devices 151 mounted in the vehicle.

This communication I/F 53 corresponds to, for example, a connector and an electric circuit for connecting a communication line when connecting with the electronic devices 151 via the communication line.

Note that the above-described electronic devices 151 include a device for enabling the vehicle control process executed by the information-process unit 52.

The power supply circuit 54 receives power supplied from an in-vehicle battery 152 mounted on the vehicle and supplies required electric power to each part of the second substrate 12.

The power transmission unit 55 includes an oscillator that oscillates at a predetermined frequency, the power transmission coil, and a driver that supplies AC power to the power transmission coil, and is a device that performs power supply in a contactless manner.

The power transmission unit 55 receives a control signal from the information-process unit 52 and executes a power supply operation to the power receiving section 41.

It should be noted that the power transmission unit 55 and the power reception unit 41 may employ a known configuration of an electromagnetic induction method or a magnetic field resonance method, for example, that enables them to perform a contactless power supply method.

(3) Configuration of the Casing

The casing 15 holds the camera module 11 and the second substrate 12 therein.

Note that directions of top and bottom (up and down, etc.) used in the following description are top and bottom in a case of a mounting state exemplified in the present embodiment, and are used only for the convenience of explanation and do not limit the configuration of the present disclosure.

As shown in FIG. 2, the casing 15 includes an upper component 61, a lower component 62, and a partition wall component 64.

The upper component 61 has a container-shape with its lower part open.

The lower component 62 is assembled to the lower part of the upper component 61 to close the opening so that a box body is configured by the upper component 61 together with the lower component 62.

The partition wall component 64 is disposed inside the casing 15.

The first substrate 11b and the second substrate 12 are accommodated in the single casing 15.

An opening 63 through which the lens unit 11a of the camera module 11 is exposed is formed in the upper component 61.

In addition, the casing 15 is partitioned by the partition wall component 64 to form an upper space 65 in which the camera module 11 is disposed and a lower space 66 in which the second substrate 12 is disposed.

The upper space 65 and the lower space 66 are separate spaces inside the casing 15.

The partition wall component 64 is disposed between the first substrate 11b and the second substrate 12.

Transmission of heat between the first substrate 11b and the second substrate 12 by radiation is inhibited by this partition wall component 64, and since the upper space 65 and the lower space 66 are separate spaces, transmission of heat due to convection is also inhibited.

Almost the whole of the casing 15 is made of a material which does not impede wireless communication.

In the present embodiment, the casing 15 is made of a synthetic resin having a low reflectivity and absorptivity to radio waves.

The material of the casing 15 is not limited to a synthetic resin, and for example, glass or wood may optionally be used.

Further, the casing 15 may be formed by a combination of a material such as a metal that impedes wireless communication and a material such as a synthetic resin that does not impede wireless communication.

Since a material of the partition wall component 64 in the casing 15 particularly has a large influence on wireless communication, at least a part of the partition wall component 64 may be made of a material that does not impede wireless communication.

A portion that does not impede wireless communication in the partition wall component 64, in other words, a portion that transmits radio waves corresponds to a radio wave transmitting section.

(4) Process by a Control Unit
<Recognition Process>

In the present embodiment, the information-process unit 52 recognizes a situation outside the vehicle 5 by recognition process.

More specifically, the information-process unit 52 recognizes lanes, road shapes, road surface conditions, light sources, preceding vehicles, oncoming vehicles, stationary vehicles, preceding pedestrians, oncoming pedestrians, stationary pedestrians, motorcycles, bicycles, obstacles, roadside objects, road signs, traffic lights, road markings, signboards, tunnels, evacuation areas, objects blocking the field of view of the camera module 11, predefined objects such as buildings, and meteorological environments.

Here, the road shape means a curvature and an inclination of the road, and the road surface condition means a condition of the road surface or the like where the light is easily reflected by rain, snow, or the like.

Examples of the light sources include a tail light of a preceding vehicle and a headlight of an oncoming vehicle.

A preceding pedestrian is a pedestrian who is walking in front of the vehicle in the same direction as the traveling direction of the own vehicle, an oncoming pedestrian is a pedestrian who is walking in front of the vehicle in a direction opposite to the traveling direction of the own vehicle, and a stationary pedestrian is a person standing still.

Examples of obstacles include rocks and the like, and examples of roadside objects include roadside obstacles such as curbstones, guardrails, poles, trees, walls, buildings, parked vehicles, parked bicycles, utility poles, and the like.

Further, the evacuation area is an area provided on a side of a road for avoiding a vehicle or the like approaching from behind.

Examples of objects blocking the field of view of the camera module 11 include dirt adhering to a portion positioned in the windshield 2 in front of the lens unit 11a of the camera module 11 or dirt attached to the lens unit 11a, or objects such as paper adhering to the above portion of the windshield 2.

In addition, examples of meteorological environments include rain, snow, fog, backlight, and the like.

Also, the lane is recognized by recognizing a position of a white line on the road.

The position of the white line is recognized by performing well-known white line recognition process (for example, white line recognition process using image binarization and Hough transformation) on the captured image by the camera module 11.

Further, the light source is recognized by successively performing well-known recognition process on the captured image by the camera module 11.

That is, the information-process unit 52 recognizes, as a light source, an object having a luminance of a predetermined value or more, a shape close to a predetermined shape, a color close to a predetermined color, and the like among the objects captured in the captured image, and the information-process unit 52 specifies position coordinates in the captured image.

Further, the information-process unit 52 recognizes, for example, that the light source is a tail light of a preceding vehicle or that the light source is a headlight of an oncoming vehicle.

Here, for example, if the color of the light source is a color within a predetermined range close to red, the information-process unit 52 recognizes that the light source is the tail light of the preceding vehicle, and if the color of the light source is a color within a predetermined range close to white, it recognizes that the light source is the headlight of the oncoming vehicle.

<Vehicle Control Process>

In the present embodiment, the information-process unit 52 performs the following process as vehicle control process: a lane deviation warning process, a lane keeping process, a headlight control process, an upon-meeting collision avoidance process, an intersection collision avoidance process, a forward collision avoidance process, a sign display process, a speed limit display process, a speed limit excess warning process, an automatic wiper process, a lane change support process, a birds-view display process, an automatic parking process, an full range adaptive cruise control process, a blind spot warning process, a rearward cross traffic warning process, a forward cross traffic warning process, a vehicle following distance warning process, a rear-end collision warning process, and a false start prevention process.

The lane deviation warning process referred to here is a process in which the information process section 52 makes a lane deviation determination and causes a buzzer and a speaker to output a warning to an occupant of the own vehicle in accordance with the determination result of the lane deviation determination.

Here, the lane deviation determination is a determination as to whether or not there is a possibility that the own vehicle will deviate from the lane and a determination as to whether or not the own vehicle is deviating from the lane.

The lane deviation warning process is executed based on recognition results concerning the lanes, the road shapes, and the like.

The lane keeping process is a process of controlling a steering device that operates a turning angle of tires of a vehicle so as the own vehicle not to deviate from the lane, and is executed based on a recognition result concerning the lanes, the road shapes, and the like.

The headlight control process is a process of executing control to switch a headlight high beam and low beam of the own vehicle or control to swivel an optical axial direction of the headlight.

The headlight control process is executed based concerning recognition results on the lanes, the road shapes, the road surface conditions, the light sources, and the like.

The upon-meeting collision avoidance process is a process of avoiding a collision before reaching an intersection by controlling controlled objects related to the movement of the vehicle such as the steering device and brakes when a vehicle or the like crossing the front of the own vehicle and the own vehicle are likely to collide with each other.

The intersection collision avoidance process is a process of avoiding a collision before reaching an intersection by controlling controlled objects related to the movement of the vehicle such as the steering device and the brakes when a vehicle, a pedestrian, or the like and the own vehicle are likely to collide with each other when the own vehicle is making a turn at the intersection.

The forward collision avoidance process is a process of avoiding a collision before reaching an intersection by controlling controlled objects related to the movement of the vehicle such as the steering device and the brakes when there is a possibility of the preceding vehicle or the like colliding with the own vehicle.

In addition, a process for causing a buzzer and a speaker to output a warning when a signboard or a tunnel is recognized and the own vehicle cannot pass under a signboard or through a tunnel is included in the upon-meeting collision avoidance process, the intersection collision avoidance process and the forward collision avoidance process.

The upon-meeting collision avoidance process and the intersection collision avoidance process are executed based on the road surface condition, and presence of preceding vehicles, oncoming vehicles, stationary vehicles, preceding pedestrians, oncoming pedestrians, stationary pedestrians, motorcycles, bicycles, obstacles, roadside objects, signboards, tunnels, and the like.

Further, the forward collision avoidance process is executed based on the recognition result concerning the evacuation area in addition to the recognition results used in executing the upon-meeting collision avoidance process and the intersection collision avoidance process.

The sign display process is a process of displaying instruction contents of road signs, traffic lights, road markings, and the signboards, on a display which is mounted on the vehicle, capable of displaying images, and is executed based on the recognition results concerning the road signs, traffic lights, road markings, signboards, and the like.

In addition, the speed limit display process is a process of displaying the speed limit indicated by the road sign, and is executed based on the recognition result of the road sign or the like.

The speed limit excess warning process is a process for causing the buzzer and the speaker to output a warning to the occupant of the own vehicle when the speed of the own vehicle exceeds the speed limit, and is executed based on the recognition result of the road sign or the like.

The automatic wiper process is a process of controlling the operation of the wiper in accordance with rainfall or the like, and is executed by determining the situation of visibility drop based on the recognition results concerning the road surface conditions, the meteorological environments, and the like.

The lane change support process is a process of controlling the steering device, brakes, transmission, and turn signals so as to support the driver's lane change, and for example, the lane change support process detects a vehicle traveling in an adjacent lane, and notifies the driver when changing lanes.

In addition, the birds-view display process is a process of displaying captured images of the entire surroundings of the vehicle on the display.

Further, the automatic parking process is a process of controlling the steering device and the brakes so as to perform the parking automatically, and the full range adaptive cruise control process is a process of controlling the brakes, a power generating device and the transmission so as to travel following the preceding vehicle.

It should be noted that the lane change support process, the birds-view display process, the automatic parking process and the full range adaptive cruise control process are executed based on the following recognition results.

That is, these process are executed based on the recognition results concerning lanes, road shapes, preceding vehicles, oncoming vehicles, stationary vehicles, preceding pedestrians, oncoming pedestrians, stationary pedestrians, motorcycles, bicycles, obstacles, roadside objects, road signs, the traffic lights, the road markings, and the like.

The blind spot warning process is a process for causing the buzzer and the speaker to output sounds in order to alert the driver when a vehicle or the like enters diagonally behind or the like corresponding to the blind spot of the traveling own vehicle.

The rearward cross traffic warning process is process for causing the buzzer and the speaker to output sounds in order to alert the driver when a vehicle or the like enters behind the own vehicle corresponding to the blind spot during reversing the own vehicle into a parking lot or the like.

In addition, the forward cross traffic warning process is a process for causing the buzzer and the speaker to output sounds in order to alert the driver when there is a vehicle or the like at a blind spot in front of the own vehicle at an intersection or the like with poor visibility.

The blind spot warning process, the backward cross traffic warning process, and the forward cross traffic warning process are executed based on the following recognition results.

That is, these processes are executed based on the recognition results concerning the preceding vehicles, oncoming vehicles, stationary vehicles, preceding pedestrians, oncoming pedestrians, stationary pedestrians, motorcycles, bicycles, obstacles, roadside objects, road signs, traffic lights, road markings, and the like.

The vehicle following distance warning process is a process for causing the buzzer and the speaker to output sounds in order to alert the driver when a distance to the preceding vehicle becomes shorter than a predetermined warning distance.

In addition, the rear-end warning process is a process for causing the buzzer and the speaker to output sounds in order to alert the driver when it is likely to collide with the preceding vehicle.

It should be noted that the vehicle following distance warning process and the rear-end warning process are executed based on the recognition results concerning the preceding vehicle or the like.

In addition, the false start prevention process is a process of controlling the brakes and the power generating device when an accelerator (gas pedal) is stepped on despite an existence of a building in front of the own vehicle when the vehicle is stopped, and is executed based on building recognition.

It should be noted that when it is recognized that the field of view of the camera module 11 is obstructed in each above-mentioned vehicle control process, the information-process unit 52 stops at least a part of the controls executed in the vehicle control process, in particular, the controls of the controlled objects related to the movement of the own vehicle such as the steering device and the brakes.

Further, even when the meteorological environment, such as heavy rain, in which image recognition by the camera module 11 is difficult to execute is recognized in each above-mentioned vehicle control process, the information-process unit 52 stops at least a part of the controls executed in the vehicle control process.

[1-2. Effects]

According to the first embodiment detailed above, the following effects can be obtained.

(1a) The first substrate 11b and the second substrate 12 of the camera module 11 perform wireless communication in the camera system 1.

Therefore, as compared with a configuration in which the first substrate 11b and the second substrate 12 are communicated by using a cable, the degree of freedom of layout of the camera module 11 and the second substrate 12 is improved, and the miniaturization of the camera system 1 can be enabled.

In addition, errors of communication due to connection failure of the cable do not occur, and the cause of the error can be easily determined.

Specific examples in which the degree of freedom of design is improved will be described with reference to FIGS. 7 to 10.

Figure 7:
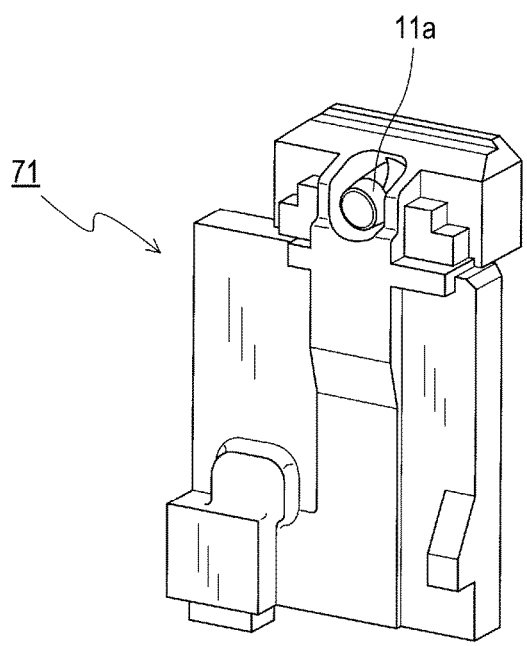
FIG. 7 shows a perspective view illustrating a camera system according to a first modification.
Figure 8:
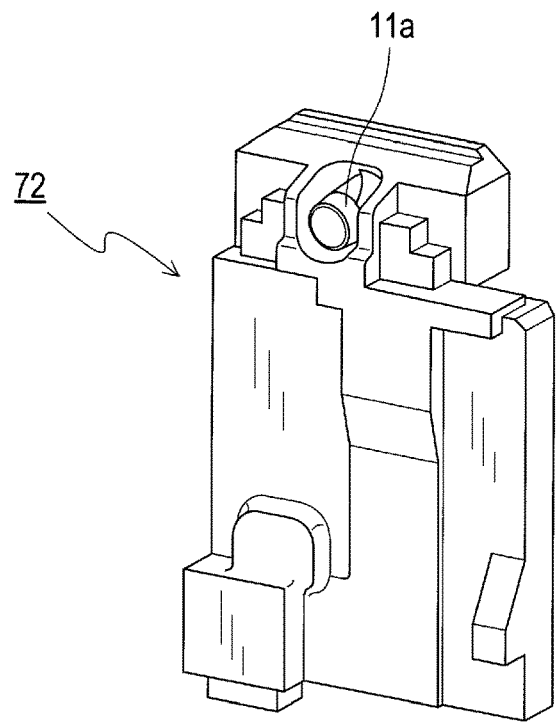
FIG. 8 shows a perspective view illustrating a camera system of a second modification.

FIGS. 7 and 8 are diagrams showing a camera system 71 and another camera system 72 in which positions of the camera modules 11 are different from each other.

Figure 9:
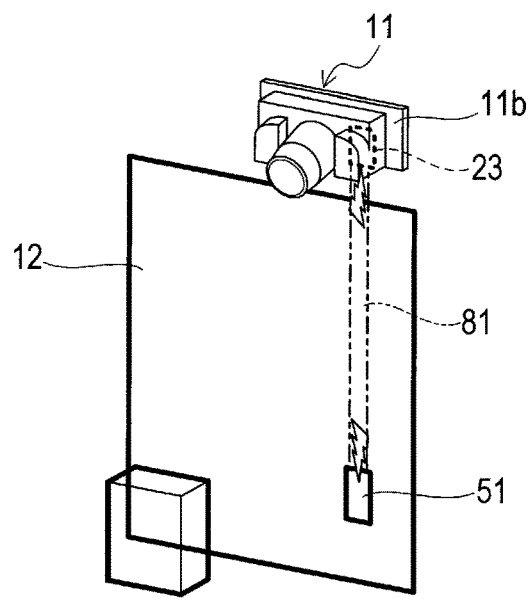
FIG. 9 shows a perspective view illustrating a camera system of a third modification.

When the first communication unit 23 and the second communication unit 51 are connected by using a flat wire cable, a flat wire cable 81 can be linearly disposed in the camera system 71 as shown in FIG. 9.

Figure 10:
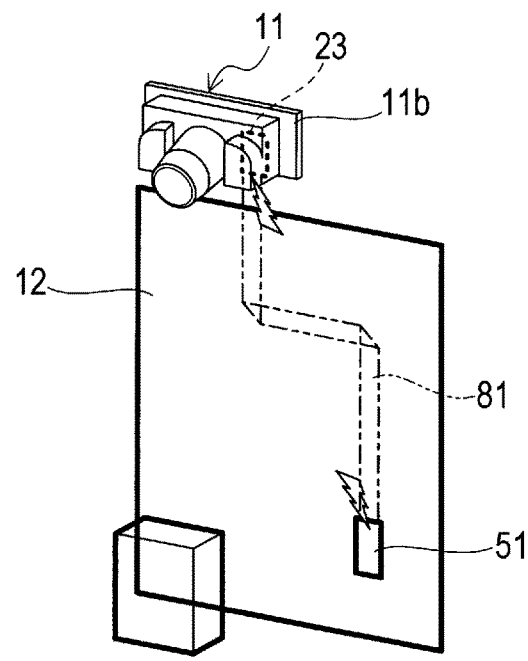
FIG. 10 shows a perspective view illustrating a camera system of a fourth modification.

On the other hand, in the comparative camera system 72, as shown in FIG. 10, since the position of the first substrate 11b with respect to the second substrate 12 is different, it is necessary to bend the flat wire cable 81, change the length, and it is necessary to empty a space so that the cable 81 and other members do not interfere with each other, and therefore obstacles to design change are increased.

On the other hand, when the first communication unit 23 and the second communication unit 51 are communicated wirelessly, there is no restriction as described above.

Therefore, the position of the camera module 11 with respect to the second substrate 12 can be freely set.

(1b) Since the first substrate 11b and the second substrate 12 are disposed in the separate spaces being shielded by the partition wall component 64, heat generated at one of the substrates is suppressed from transferring to the other substrate by convection of air and radiation.

In particular, since the image sensor 21 of the first substrate 11b is susceptible to heat, by suppressing the heat generated in the second substrate 12 from being transferred, image information that is not suitable for recognition process such as noisy image information can be suppressed from being outputted.

[1-3. Modifications]

It should be appreciated that, in the modifications, components identical with or similar to those in the first embodiment are given the same reference numerals, and repeated structures and features thereof will not be described in order to avoid redundant explanation.

The first substrate 11b of the camera module 11 may be configured so that its position in the casing 15 can be changed.

For example, it is possible to configure so that the angle at which the lens unit 11a is disposed can be changed.

Figure 11:
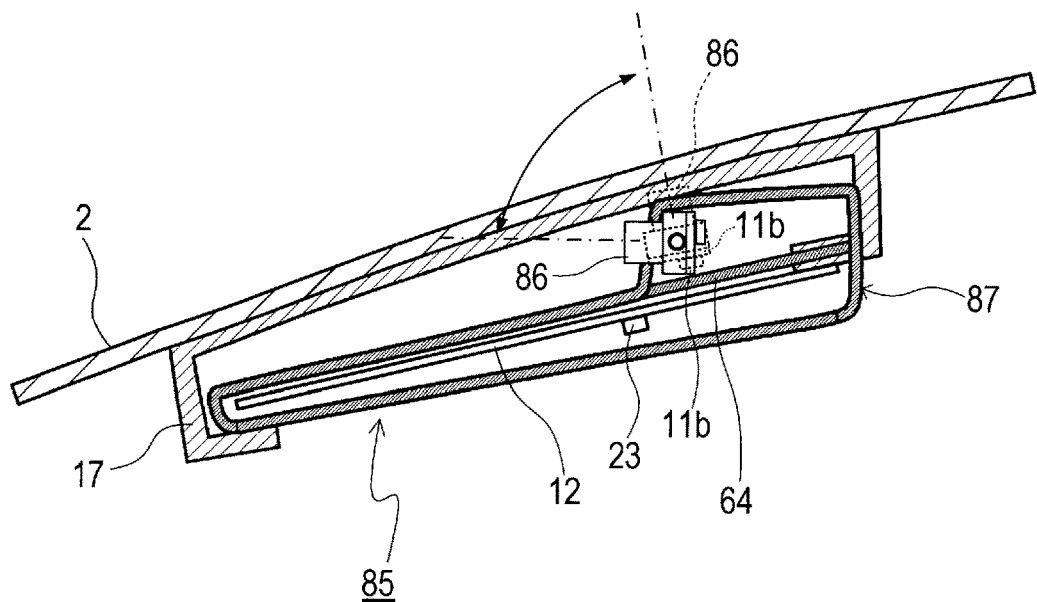
FIG. 11 shows a sectional view illustrating a camera system of a fifth modification.

As shown in FIG. 11, a camera module 86 is rotatably supported by a casing 87 in a camera system 85, and a position of the first substrate 11b is configured to be adjustable.

In this case, unlike a configuration in which communication is performed between the first substrate 11b and the second substrate 12 by using a cable, there is no need to consider a handling of the cable in a case of adjusting the position of the camera module 86, so that a large angle change can be made.

Thereby, it becomes possible to mount the same camera system 85 to different vehicles, for example, where an installation angle of the camera system 85 is significantly different.

Further, although the configuration in which the first substrate 11b of the camera module 11 receives the electric power by the contactless power supply method has been exemplified in the above-described embodiment, the first substrate 11b may be configured to acquire electric power by a cable.

The source of the electric power acquisition may be the second substrate 12 or the in-vehicle battery 152.

Since cables for power supply are narrower in width than flat wire cables, there are few restrictions for disposing the cables.

Further, although the configuration in which radio communication by radio waves is performed has been exemplified in the above-described embodiment, light may be optionally used for radio communication.

In that case, an optical transmitter and an optical receiver are disposed in each of the first communication unit 23 and the second communication unit 51, respectively.

Figure 12:
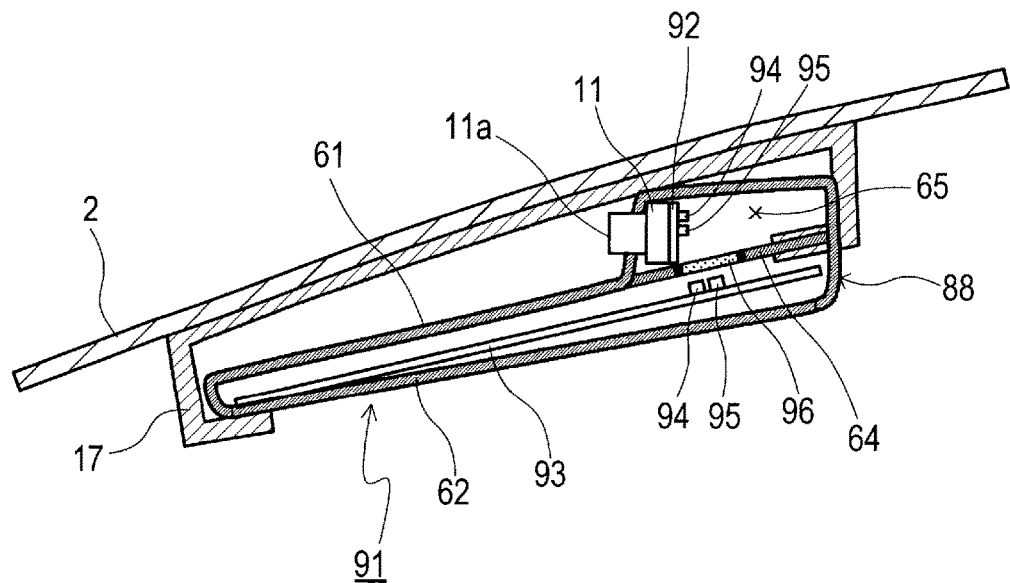
FIG. 12 shows a sectional view illustrating a camera system of a sixth modification.

As shown in FIG. 12, optical transmitters 94 and optical receivers 95 are disposed respectively on a first substrate 92 and a second substrate 93 in a camera system 91.

At least a portion existing between the optical transmitters 94 and the optical receivers 95 in a partition wall component 64 of a casing 88 can be a light transmitting portion 96 made of a material that transmits light.

Figure 13:
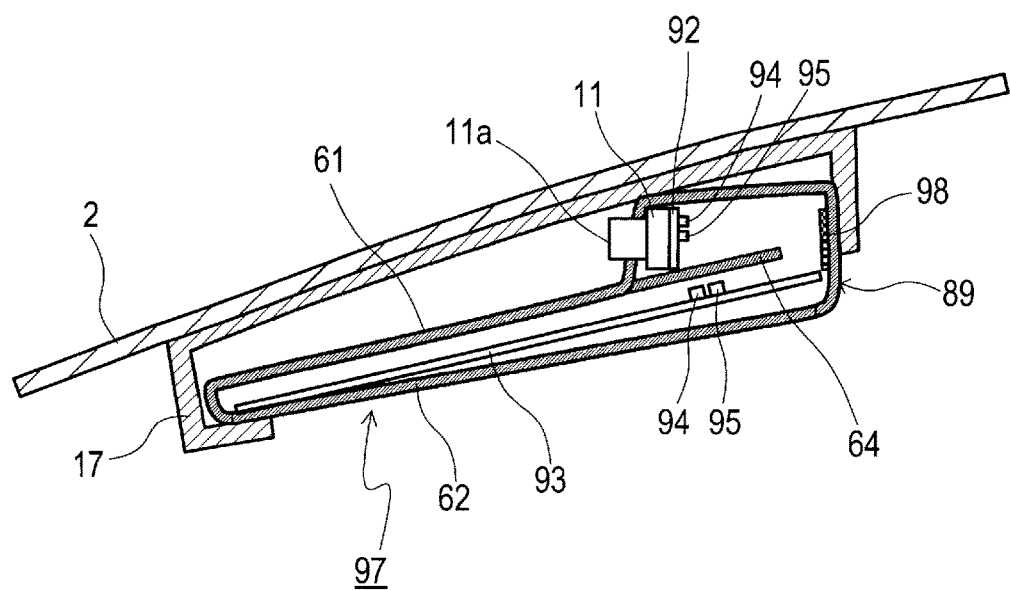
FIG. 13 shows a sectional view illustrating a camera system of a seventh modification.

Further, as in a camera system 97 shown in FIG. 13, one or more reflecting plates 98 may be disposed in a casing 89 so that the light output from the optical transmitters 94 reach the optical receivers 95.

It should be noted that a provision of the reflecting plate may be used in a case where the wireless communication method is performed by radio waves.

That is, the reflecting plates 98 can be disposed in a configuration for performing wireless communication using electromagnetic waves.

The reliability of wireless communication can be improved with this reflecting plate 98.

The reflecting plates 98 correspond to an electromagnetic wave reflecting section.

The electromagnetic wave reflecting section may be disposed only on a surface of a part of the casing or may be disposed in the entire casing.

[2. Second Embodiment]

[2-1. Differences from the First Embodiment]

In a second embodiment, an electrical configuration of a camera system is basically the same as that of the first embodiment.

However, since a shape of a casing is largely different, this point will be mainly described.

It should be appreciated that, in the second embodiment, components identical with or similar to those in the first embodiment are given the same reference numerals, and repeated structures and features thereof will not be described in order to avoid redundant explanation.

Figure 14:
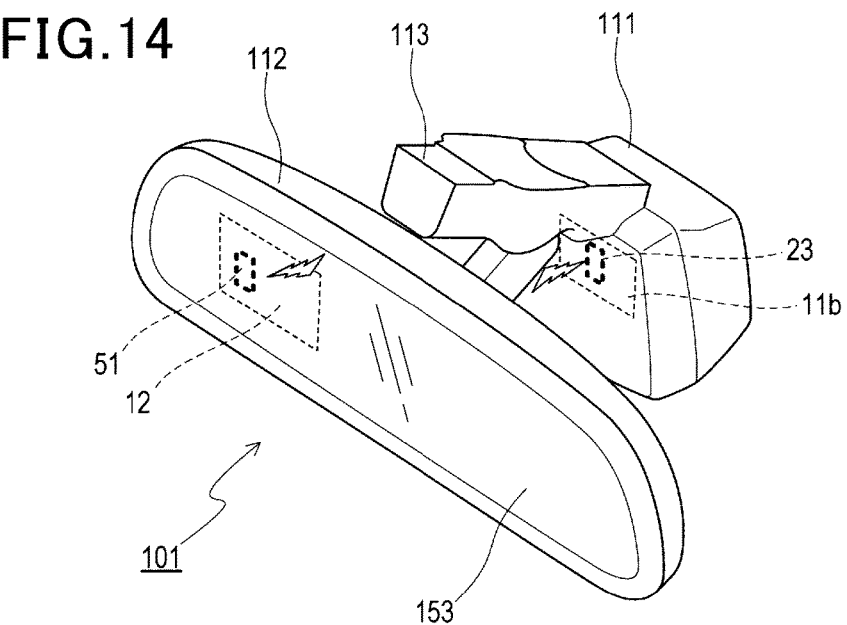
FIG. 14 shows a first perspective view of a camera system according to a second embodiment.
Figure 15:
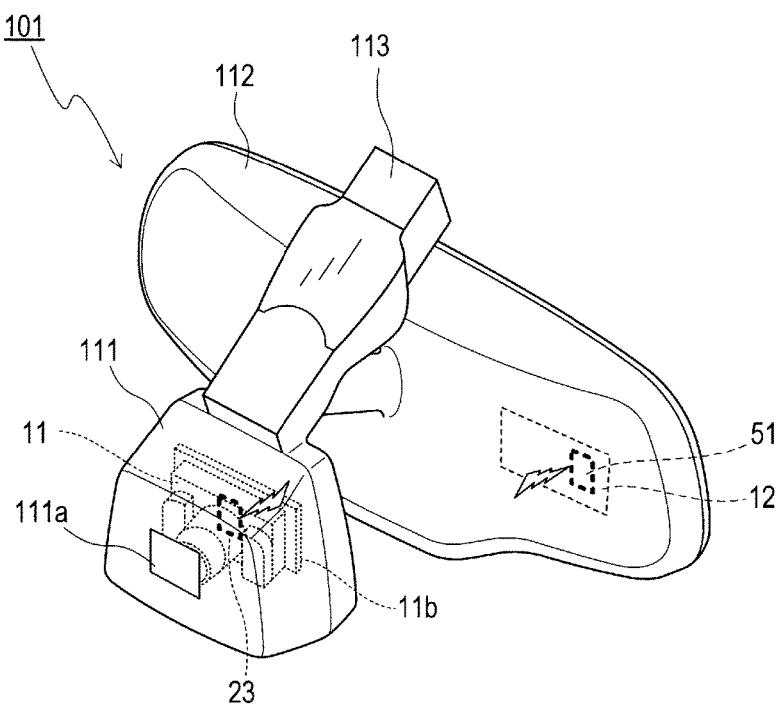
FIG. 15 shows a second perspective view of the camera system according to the second embodiment.

As shown in FIGS. 14 and 15, a camera system 101 includes a camera module 11, a second substrate 12, a first casing 111 in which the camera module 11 is accommodated, a second casing 112 in which the second substrate 12 is accommodated and a rear-view mirror 153 is disposed, and a mounting portion 113 being fixed to the windshield 2.

The first casing 111, the second casing 112, and the mounting portion 113 are connected to each other to form a single unit.

Wall surfaces of the first casing 111 and the second casing 112, which exist between the camera module 11 and the second substrate 12, correspond to partition wall components.

Both the first casing 111 and the second casing 112 are made of a material that transmits radio waves such as synthetic resin.

An opening 111a through which a lens unit 11a of the camera module 11 captures light from the outside is formed in the first casing 111.

As in the first embodiment described above, the first substrate 11b and the second substrate 12 are connected by radio communication.

In addition, the second substrate 12 acquires electric power from the in-vehicle battery 152, and the first substrate 11b acquires electric power from the second substrate 12 by the contactless power supply method.

It should be noted that power may be acquired from the in-vehicle battery 152 or the second substrate 12 by using a cable without adopting the contactless power supply method for supplying power to the first substrate 11b.

[2-2. Effects]

According to the second embodiment detailed above, in addition to the effect (1a) of the above-described first embodiment, the following effects can be obtained.

(2a) Heat transfer can be greatly reduced by disposing the first substrate 11b of the camera module 11 and the second substrate 12 in different casings.

Therefore, it becomes possible that image information not suitable for recognition process such as noisy image information can be suppressed from being outputted.

[2-3. Modification]

Although the configuration in which radio communication by radio waves is performed has been exemplified in the above-described embodiment, light may be optionally used for radio communication.

In that case, an optical transmitter and an optical receiver are disposed in each of the first communication unit 23 and the second communication unit 51, respectively.

Figure 16:
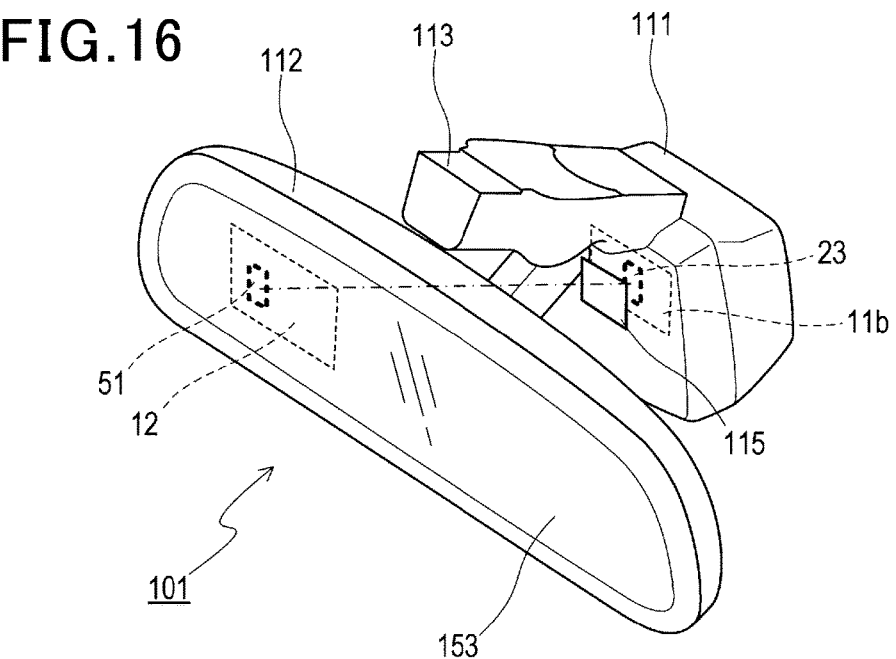
FIG. 16 shows a third perspective view of the camera system according to the second embodiment.
Figure 17:
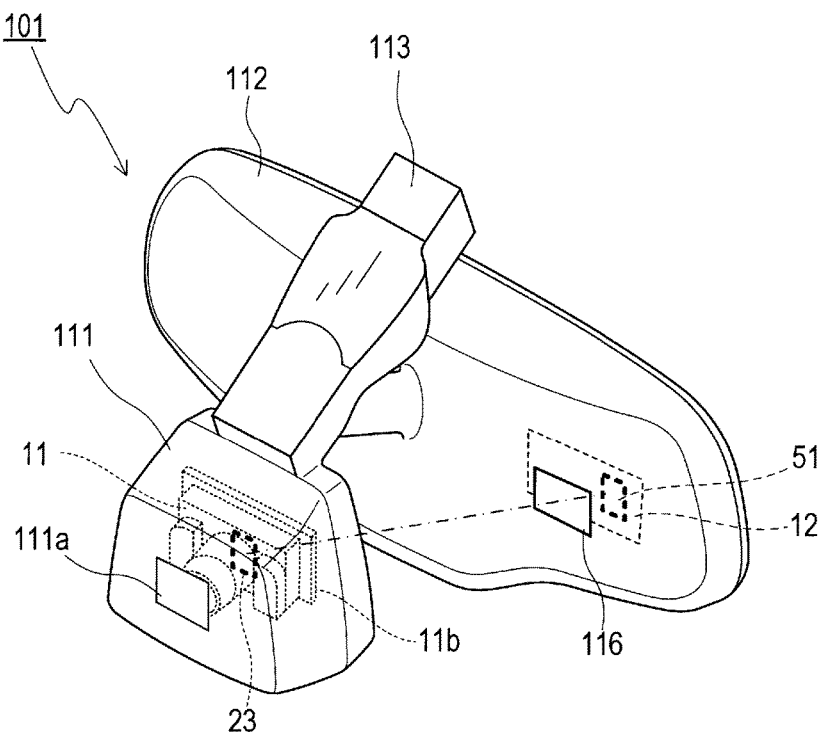
FIG. 17 shows a fourth perspective view of the camera system according to the second embodiment.

It is desirable that no obstacle to the transmission/reception of light exists on a straight line connecting the first communication unit 23 and the second communication unit 51 as shown in FIGS. 16 and 17.

Therefore, a portion of the first casing 111 that intersects with the straight line may be referred to as a first light transmitting portion 115 made of a material that transmits light, and a portion of the second casing 112 that intersects with the straight line may be referred to as a second light transmitting portion 116 similar to the first light transmitting portion 115.

[3. Other Embodiments]

Although the embodiments for carrying out the present disclosure have been described above, the present disclosure is not limited to the above-described embodiments, and various modifications can be made.

(3a) Although the configuration having the partition wall component disposed between the first substrate and the second substrate is exemplified in the above-described embodiment, the configuration without the partition wall component may be adopted.

(3b) The configuration in which the first substrate and the second substrate are disposed in one casing is exemplified in the first embodiment, and the other configuration in which the first substrate is disposed in one of the plurality of casings, the second substrate is disposed in the other one of the casings, and both casings are integrated with each other in the second embodiment.

However, the first substrate and the second substrate may be disposed separately.

Although the first substrate is disposed integrally with the camera module in the vicinity of the windshield 2, for example, the second substrate may be disposed inside an instrument panel.

(3c) The configuration in which the first substrate 11b and the second substrate 12 are accommodated in the single casing 15, and are accommodated in different spaces within the casing 15 has been exemplified in the first embodiment.

In this strict sense, different spaces referred to here is not limited to two completely separated spaces, but may be partially connected spaces.

For example, a space through which a power supply cable connecting the first substrate and the second substrate passes may be formed.

This can be regarded as separate spaces as long as at least sufficient heat transfer can be suppressed from occurring.

(3d) The function of one component in each of the above embodiments may be shared among a plurality of components, or the functions of a plurality of components may be exerted on a single component.

In addition, the plurality of functions of the plurality of components may be enabled by one component, or one function enabled by the plurality of components may be enabled by one component.

Further, a part of the configurations of the above embodiments may be omitted.

Furthermore, at least a part of the configuration of the above embodiment may be added to or replaced with the configuration of the other embodiment described above.

It should be noted that all aspects included in the technical concept specified only by the language described in the claims are embodiments of the present disclosure.

What is claimed is:

1. A camera system mounted on a vehicle comprising:
    a first substrate including:
        a lens unit having a plurality of lenses and a cylindrical lens barrel for holding the plurality of lenses,
        a casing formed with an opening through which the lens unit is exposed,
        an image pickup element for generating image information by photoelectric conversion, and
        a first communication unit; and
    a second substrate including:
        a second communication unit for performing wireless communication with the first communication unit, and
        a first information processing section at least capable of recognition processing for recognizing a situation outside the vehicle based on the image information acquired via the second communication unit,
    wherein the first substrate and the second substrate are respectively accommodated in spaces partially or fully partitioned by a partition wall component disposed inside the casing.

2. The camera system according to claim 1, wherein, the first substrate and the second substrate are accommodated in a single casing.

3. The camera system according to claim 2, wherein, the first substrate and the second substrate are disposed in separate spaces inside the casing.

4. The camera system according to claim 2, wherein,
a position of the first substrate is configured to be adjustable inside the casing.

5. The camera system according to claim 2, wherein,
the first communication unit and the second communication unit are configured to enable wireless communication by electromagnetic waves; and
at least a part of the casing is an electromagnetic wave reflecting section which improves a reliability of the wireless communication by reflecting electromagnetic waves.

6. The camera system according to claim 1, wherein,
the partition wall component is disposed between the first substrate and the second substrate.

7. The camera system according to claim 6, wherein,
the partition wall component is configured to suppress heat from moving between the first substrate and the second substrate.

8. The camera system according to claim 6, wherein,
the first communication unit and the second communication unit are configured to enable wireless communication by radio waves; and
at least a part of the partition wall component is a radio wave transmitting section that transmits radio waves.

9. The camera system according to claim 6, wherein,
the first communication unit and the second communication unit are configured to enable wireless communication by light; and
at least a part of the partition wall component is a light transmitting portion that transmits light.

10. The camera system according to claim 1, wherein,
the second substrate includes a power transmission unit configured to be capable of performing a non-contacting power supply method to an external device; and
the first substrate includes a power receiving section that receives electric power supplied from the power transmission unit.

11. The camera system according to claim 1, wherein,
the partition wall is formed as part of the casing.

12. A camera system mounted on a vehicle comprising:
a first substrate including:
    a lens unit having a plurality of lenses and a cylindrical lens barrel for holding the plurality of lenses,
    an image pickup element for generating image information by photoelectric conversion, and
    a first communication unit,
a first casing formed with an opening through which the lens unit is exposed;
a second casing formed separately from the first casing; and
a second substrate including:
    a second communication unit for performing wireless communication with the first communication unit, and
    a first information processing section at least capable of recognition processing for recognizing a situation outside the vehicle based on the image information acquired via the second communication unit,
wherein the first substrate is accommodated in the first casing and the second substrate is accommodated in the second casing.

* * * * *